Feb. 25, 1941.  K. HIPKE ET AL  2,233,010
LIGHTTIGHT PACKING FOR PHOTOGRAPHIC FILM
Filed Feb. 28, 1939
Fig. 3     Fig. 1     Fig. 2
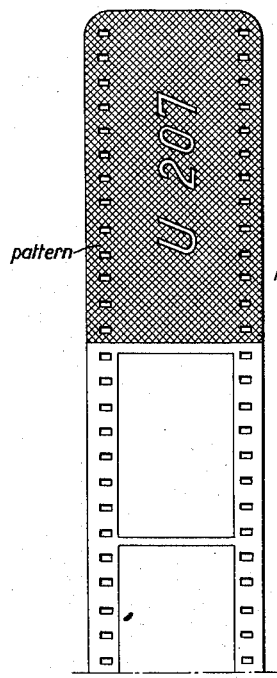
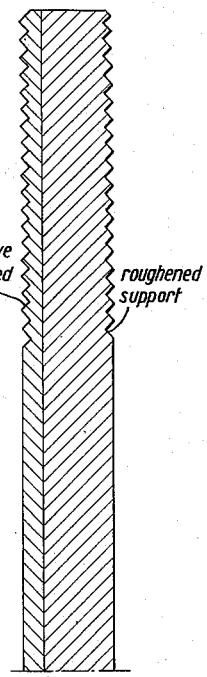
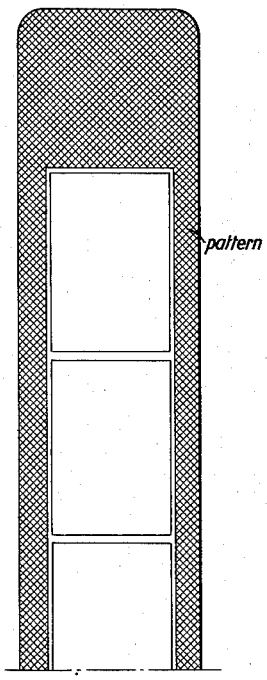
pattern — light-sensitive layer roughened — roughened support — pattern
Fig. 4
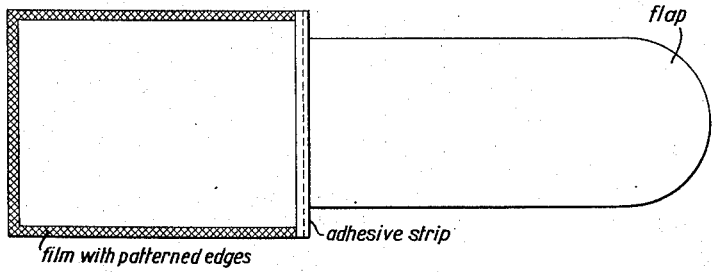
flap — adhesive strip — film with patterned edges
Inventors
Kurt Hipke
Alfred Miller
By Their Attorneys Patented Feb. 25, 1941

2,233,010

UNITED STATES PATENT OFFICE 2,233,010

LIGHTTIGHT PACKING FOR PHOTOGRAPHIC FILM

Kurt Hipke and Alfred Miller, Dessau, Germany, assignors, by mesne assignments, to General Aniline & Film Corporation, New York, N. Y., a corporation of Delaware Application February 28, 1939, Serial No. 258,898
In Germany March 1, 1938

4 Claims. (Cl. 95—9)

Our present invention relates to a lighttight packing for photographic film.

The lighttightness of daylight packing for roll films or cinematograph films is affected by the so-called "creeping light." By this expression is meant the light which, for example at the plush packing provided at the exit for the film in a protective casing, roll film cassette, film pack cassette or the like, enters into the light-sensitive layer and the support itself and by progressive reflection from the walls of the layer and its support travels in the longitudinal direction of the film some considerable distance beyond the packing, so that a comparatively long piece of the film is rendered useless by fogging. The same phenomenon occurs especially when light can penetrate from the side into a film protected over its surface against incident light; for example, the narrow marginal fog frequently occurring in the case of roll film packings at the longitudinal edges of the film is at least in part due to such creeping light.

In order to avoid the marginal fog produced in this manner in roll films it has been recommended that the edges of the protective paper strip and the spool flanges of the roll film should be given various forms. This expedient, however, is associated with disadvantages, for example with the production of paper dust that settles on the light-sensitive layer or with a hindrance to the unwinding of the roll film. There is still no means known for preventing the injurious effect of creeping light in the case of the lighttightness of the mouth of the protective casing of a roll film or the daylight cassette for a cinematograph film.

Our invention has for an object the provision of a film roughened or otherwise provided with an uneven surface at the place which is liable to be endangered by creeping light in order to hinder or prevent the penetration of the creeping light.

Another object of this invention is to provide an especially simple and neat form of roughening obtained by impressing in the surface of the film a regular or irregular pattern. Both a comparatively coarse pattern and a very fine pattern scarcely visible to the naked eye serve the purpose.

A further object of the invention is to provide a film the end and/or the edges of which are treated with a hot pressing-iron. For example ironing the Celluloid side for 10 seconds with a pressing-iron heated to 110–120° C. may sufficiently distort, warp or corrugate a part of the film treated that a creeping light is effectively absorbed.

Other objects of our invention will appear from the following description.

Reference is made to the accompanying drawing in which:

Fig. 1 shows an enlarged cross section of a film provided at its end on the light-sensitive surface and the back part with roughening.

Fig. 2 shows a roll film carrying pattern at its end and its longitudinal edges.

Fig. 3 shows a perforated roll film the end of which is patterned and carries a mark.

Fig. 4 shows a section of a film pack with flap and adhesive strip, the films being provided with patterned edges.

As patterns, cross lines, points, hatchings, fishbones are suitable as well as rhombic and triangular shapes, such as are used for graining leather. Hatching is preferably applied in a direction at right angles to the direction of entry of the creeping light. The best effect is obtained when both the emulsion side and the back of the film are roughened by the imprint of the pattern. However, the roughening may be only on one side of the film and still produce a marked improvement in excluding light. The roughening by imprinting a pattern is in general associated with the production of a printing fog in the emulsion; since, however, the printing fog is strictly limited to the patterned portion of the film which is not used for the production of the picture, the existence of a fog is without damage to the latter. The patterning may with advantage be simultaneously used for producing marks on the film instead of the light marking generally used; for this purpose the numbers or letters to be provided beside each picture field of a roll film and intended to indicate the manufacturing firm may be imprinted in a manner different from the surrounding patterned surfaces or they may remain in flat portions provided in the patterning.

An incidental advantage of the roughening of the longitudinal edges of roll films and cinematograph films is that the device for feeding the film which engages on the upper surface of the edge of the film, for example clamping rollers or the like, engage the patterned or otherwise roughened edges with greater certainty than when the surface is smooth at the edges. For this reason when using devices for moving the film which do not set by the pull of the winding roller on the film and hitherto have generally involved the use of perforated cinematograph films, use may be made to a greater extent than hitherto of unperforated films whereby on the one hand the film is improved in appearance and on the other hand surface is saved on the film.

We claim:

1. A light-sensitive packaged photographic film provided with means for preventing the reflection of creeping light in connection with said film, said means comprising a roughened portion extending across an end of said film outside the effective picture area of the film.

2. A light-sensitive photographic roll film provided with means for preventing the reflection of creeping light in connection with said film, said means comprising a roughened surface extending across an end of the film.

3. A light-sensitive photographic roll film provided with means for preventing the reflection of creeping light in connection with said film, said means comprising a roughened surface extending across an end and along the longitudinal edges of the film.

4. A light-sensitive packaged photographic film provided with means for preventing the reflection of creeping light in connection with said film, said means comprising a patterned and roughened surface extending across an end of said film outside the effective picture area of the film.

KURT HIPKE.
ALFRED MILLER.